United States Patent
Zhang et al.

(10) Patent No.: US 10,410,136 B2
(45) Date of Patent: Sep. 10, 2019

(54) MODEL-BASED CLASSIFICATION OF CONTENT ITEMS

(71) Applicant: LinkedIn Corporation, Mountain View, CA (US)

(72) Inventors: Yongzheng Zhang, San Jose, CA (US); Chi-Yi Kuan, Fremont, CA (US); Yi Zheng, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 952 days.

(21) Appl. No.: 14/856,275

(22) Filed: Sep. 16, 2015

(65) Prior Publication Data

US 2017/0076225 A1    Mar. 16, 2017

(51) Int. Cl.
  G06F 15/18    (2006.01)
  G06N 20/00    (2019.01)
  G06Q 10/10    (2012.01)
  G06Q 10/06    (2012.01)

(52) U.S. Cl.
  CPC ........... *G06N 20/00* (2019.01); *G06Q 10/063* (2013.01); *G06Q 10/067* (2013.01); *G06Q 10/1053* (2013.01)

(58) Field of Classification Search
  CPC .............................. G06F 16/35; G06N 20/00
  USPC ..................................................... 706/15, 45
  See application file for complete search history.

(56) References Cited

U.S. PATENT DOCUMENTS

| | | | |
|---|---|---|---|
| 8,805,845 B1 | 8/2014 | Li et al. | |
| 9,348,809 B1 | 5/2016 | Zhao et al. | |
| 9,460,457 B1 | 10/2016 | Shaffer et al. | |
| 10,019,515 B2 | 7/2018 | Markman et al. | |
| 2008/0082491 A1 | 4/2008 | Scofield et al. | |
| 2008/0154883 A1 | 6/2008 | Chowdhury | |
| 2010/0235343 A1 | 9/2010 | Cao et al. | |
| 2011/0099133 A1 | 4/2011 | Chang et al. | |
| 2011/0179114 A1* | 7/2011 | Dilip ................. | G06F 17/30867 709/204 |
| 2012/0185544 A1 | 7/2012 | Chang et al. | |
| 2014/0052674 A1 | 2/2014 | Aggarwal | |
| 2014/0058722 A1 | 2/2014 | Sun et al. | |

(Continued)

OTHER PUBLICATIONS

"Final Office Action Issued in U.S. Appl. No. 14/856,306", dated Jul. 11, 2018, 25 Pages.

(Continued)

*Primary Examiner* — David R Vincent
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains validated training data containing a first set of content items and a first set of classification tags for the first set of content items. Next, the system uses the validated training data to produce a statistical model for classifying content using a set of dimensions represented by the first set of classification tags. The system then uses the statistical model to generate a second set of classification tags for a second set of content items. Finally, the system outputs one or more groupings of the second set of content items by the second set of classification tags to improve understanding of content related to the set of dimensions without requiring a user to manually analyze the second set of content items.

20 Claims, 6 Drawing Sheets

(56) References Cited

U.S. PATENT DOCUMENTS

| | | | |
|---|---|---|---|
| 2014/0303960 A1* | 10/2014 | Orsini | G06F 17/2854 |
| | | | 704/2 |
| 2014/0337989 A1* | 11/2014 | Orsini | H04L 51/12 |
| | | | 726/26 |
| 2015/0254555 A1 | 9/2015 | Medlock | |
| 2015/0347920 A1 | 12/2015 | Medlock et al. | |
| 2016/0034584 A1 | 2/2016 | Thollya | |
| 2016/0078022 A1* | 3/2016 | Lisuk | G06F 3/04842 |
| | | | 706/12 |
| 2016/0314195 A1 | 10/2016 | Markman et al. | |
| 2016/0314200 A1 | 10/2016 | Markman et al. | |
| 2017/0024375 A1* | 1/2017 | Hakkani-Tur | G06F 17/2785 |
| 2017/0034087 A1* | 2/2017 | Borenstein | H04L 51/08 |
| 2017/0075978 A1 | 3/2017 | Zhang et al. | |
| 2018/0204111 A1* | 7/2018 | Zadeh | G06N 3/0454 |

OTHER PUBLICATIONS

"Non Final Office Action Issued in U.S. Appl. No. 14/856,306", dated Nov. 17, 2017, 21 Pages.

"Non Final Office Action Issued in U.S. Appl. No. 14/856,306", dated Nov. 29, 2018, 23 Pages.

"Final Office Action Issued in U.S. Appl. No. 14/856,306", dated Jun. 6, 2019, 24 Pages.

\* cited by examiner

MODEL-BASED CLASSIFICATION OF CONTENT ITEMS

RELATED APPLICATIONS

The subject matter of this application is related to the subject matter in a co-pending non-provisional application by inventors Yongzheng Zhang, Lutz Finger and Shaobo Liu, entitled "Topic Mining Using Natural Language Processing Techniques," having Ser. No. 14/266,633, and filing date 30 Apr. 2014.

The subject matter of this application is also related to the subject matter in a co-pending non-provisional application by inventors Vita Markman, Yongzheng Zhang, Craig Martell and Lutz T. Finger, entitled "Topic Extraction Using Clause Segmentation and High-Frequency Words," having Ser. No. 14/807,674, and filing date 23 Jul. 2015.

The subject matter of this application is related to the subject matter in a co-pending non-provisional application by the same inventors as the instant application and filed on the same day as the instant application, entitled "Model-Based Identification of Relevant Content," having Ser. No. 14/856,306, and filing date Sep. 16, 2015.

BACKGROUND

Field

The disclosed embodiments relate to text analytics. More specifically, the disclosed embodiments relate to techniques for performing model-based classification of content items.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

In particular, text analytics may be used to model and structure text to derive relevant and/or meaningful information from the text. For example, text analytics techniques may be used to perform tasks such as categorizing text, identifying topics or sentiments in the text, determining the relevance of the text to one or more topics, assessing the readability of the text, and/or identifying the language in which the text is written. In turn, text analytics may be used to mine insights from large document collections, which may improve understanding of content in the document collections and reduce overhead associated with manual analysis or review of the document collections.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
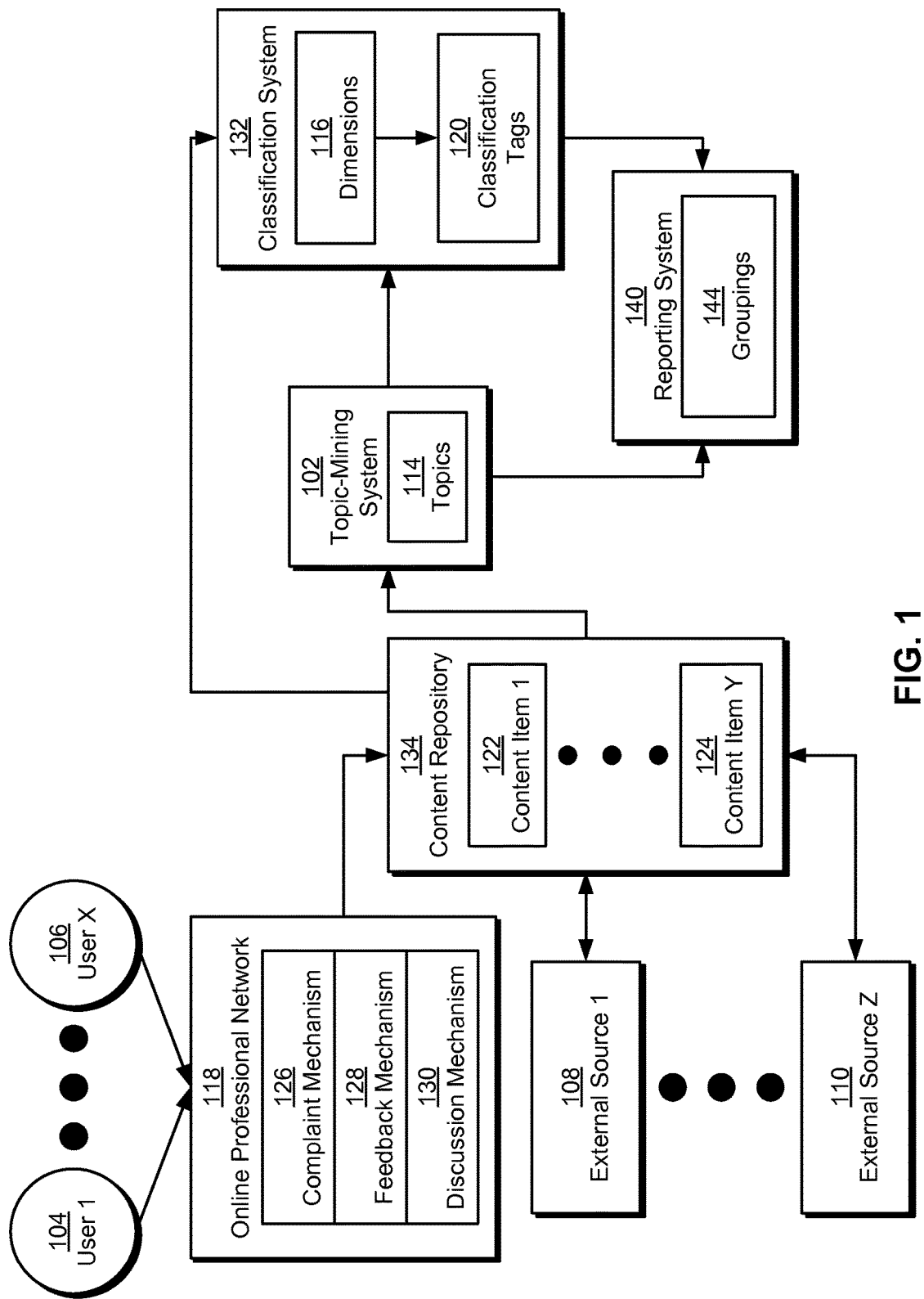
FIG. 1 shows a schematic of a system in accordance with the disclosed embodiments.

The disclosed embodiments provide a method, apparatus, and system for processing data. More specifically, the disclosed embodiments provide a method, apparatus, and system for performing model-based classification of unstructured data. As shown in FIG. 1, the unstructured data may be included in a set of content items (e.g., content item 1 122, content item y 124). The content items may be obtained from a set of users (e.g., user 1 104, user x 106) of an online professional network 118 or another application or service. Online professional network 118 may allow the users to establish and maintain professional connections, list work and community experience, endorse and/or recommend one another, and/or search and apply for jobs. Employers and recruiters may use online professional network 118 to list jobs, search for potential candidates, and/or provide business-related updates to users.

As a result, content items associated with online professional network 118 may include posts, updates, comments, sponsored content, articles, and/or other types of unstructured data transmitted or shared within online professional network 118. The content items may additionally include complaints provided through a complaint mechanism 126, feedback provided through a feedback mechanism 128, and/or group discussions provided through a discussion mechanism 130 of online professional network 118. For example, complaint mechanism 126 may allow users to file complaints or issues associated with use of online professional network 118. Similarly, feedback mechanism 128 may allow the users to provide scores representing the users' likelihood of recommending the use of online professional network 118 to other users, as well as feedback related to the scores and/or suggestions for improvement. Finally, discussion mechanism 130 may obtain updates, discussions, and/or posts related to group activity on online professional network 118 from the users.

Content items containing unstructured data related to use of online professional network 118 may also be obtained from a number of external sources (e.g., external source 1 108, external source z 110). For example, user feedback for online professional network 118 may be obtained periodically (e.g., daily) and/or in real-time from reviews posted to review websites, third-party surveys, other social media websites or applications, and/or external forums. Content items from both online professional network 118 and the external sources may be stored in a content repository 134 for subsequent retrieval and use. For example, each content item may be stored in a database, data warehouse, cloud storage, and/or other data-storage mechanism providing content repository 134.

In one or more embodiments, content items in content repository 134 include text input from users and/or text that is extracted from other types of data. As mentioned above, the content items may include posts, updates, comments, sponsored content, articles, and/or other text-based user opinions or feedback for a product such as online professional network 118. Alternatively, the user opinions or feedback may be provided in images, audio, video, and/or other non-text-based content items. A speech-recognition technique, optical character recognition (OCR) technique, and/or other technique for extracting text from other types of data may be used to convert such types of content items into a text-based format before or after the content items are stored in content repository 134.

Because content items in content repository 134 represent user opinions, issues, and/or sentiments related to online professional network 118, information in the content items may be important to improving user experiences with online professional network 118 and/or resolving user issues with online professional network 118. However, content repository 134 may contain a large amount of freeform, unstructured data, which may preclude efficient and/or effective manual review of the data by developers and/or designers of online professional network 118. For example, content repository 134 may contain millions of content items, which may be impossible to read in a timely or practical manner by a significantly smaller number of developers and/or designers.

In one or more embodiments, the system of FIG. 1 includes functionality to mine insights from content items in content item repository 134 and use the insights to improve products and user experiences associated with online professional network 118. First, a topic-mining system 102 may automatically extract a set of topics 114 from the content items. To identify topics 114, topic-mining system 102 may combine filtering of n-grams from clauses in content items with topic mining that utilizes natural language processing (NLP) techniques to generate part-of-speech (POS) tags for content items, as described in a co-pending non-provisional application by inventors Yongzheng Zhang, Lutz Finger and Shaobo Liu, entitled "Topic Mining Using Natural Language Processing Techniques," having Ser. No. 14/266,633, and filing date 30 Apr. 2014, which is incorporated herein by reference.

As an alternative or addition to NLP-based extraction of topics 114, topic mining system 102 may also separate the content items into clauses based on the presence of connective words and/or punctuation marks between adjacent groups of strings in a given content item. Topics 114 may then be selected as n-grams in the clauses that do not include stop words and/or high-frequency words in pre-specified positions, such as at the beginning or the end of the n-grams. Clause-based topic extraction is described in a co-pending non-provisional application by inventors Vita Markman, Yongzheng Zhang, Craig Martell and Lutz T. Finger, entitled "Topic Extraction Using Clause Segmentation and High-Frequency Words," having Ser. No. 14/807,674, and filing date 23 Jul. 2015, which is incorporated herein by reference.

Topic-mining system 102 may further select different topic-mining techniques for use with different types of data. For example, NLP-based topic mining may be used with content items that contain well-formed, standard POS patterns, while filtering of n-grams from clauses in content items may be used with content items that contain incomplete or nonstandard sentences, such as social media posts.

Next, a classification system 132 may generate a set of classification tags 120 for the content items based on a set of dimensions 116. Dimensions 116 may represent categories or classes by which the content items are to be classified. For example, dimensions 116 may include relevance (e.g., relevant or irrelevant), sentiment (e.g., positive, negative, neutral, unknown), products offered within online professional network 118 (e.g., sales products, marketing products, advertising products, recruiting products, etc.), value propositions related to use of online professional network 118 (e.g., hiring/marketing/selling, staying informed, networking, getting hired, connecting, etc.), and/or themes or usage contexts associated with the content items (e.g., product feedback, self-promotion, and/or connecting with other users).

As discussed in further detail below with respect to FIG. 2, classification system 132 may use validated training data that includes a set of content items tagged with dimensions 116 by domain experts to train one or more statistical models to classify the content items by dimensions 116. Classification system 132 may then use the statistical model(s) to produce classification tags 120 that classify additional sets of content items from content repository 134 by dimensions 116.

A reporting system 140 may then output one or more groupings 144 of the content items by topics 114 and/or classification tags 120. For example, reporting system 140 may include a graphical user interface (GUI) that allows developers and/or designers of online professional network 118 to view content items that contain or are relevant to specific topics (e.g., topics 114) or dimensions 116, apply one or more filters to the content items, search for content items by one or more keywords, and/or view visualizations related to the occurrence or frequency of the grouped content items. In other words, reporting system 140 may provide business intelligence tools for surfacing insights related to analysis of the content items by topic-mining system 102 and classification system 132. In turn, the system of FIG. 1 may improve the implementation and use of customer-facing solutions, customer support, sales, churn analysis, competitor analysis, public relations, and/or other activities associated with operating online professional network 118 and products offered within online professional network 118.

In some embodiments, topic-mining system 102, classification system 132, content repository 134, and reporting system 140 are implemented as part of online professional network 118 (or some other online application or service). In other embodiments, one or more of these entities are implemented separately.

Figure 2:
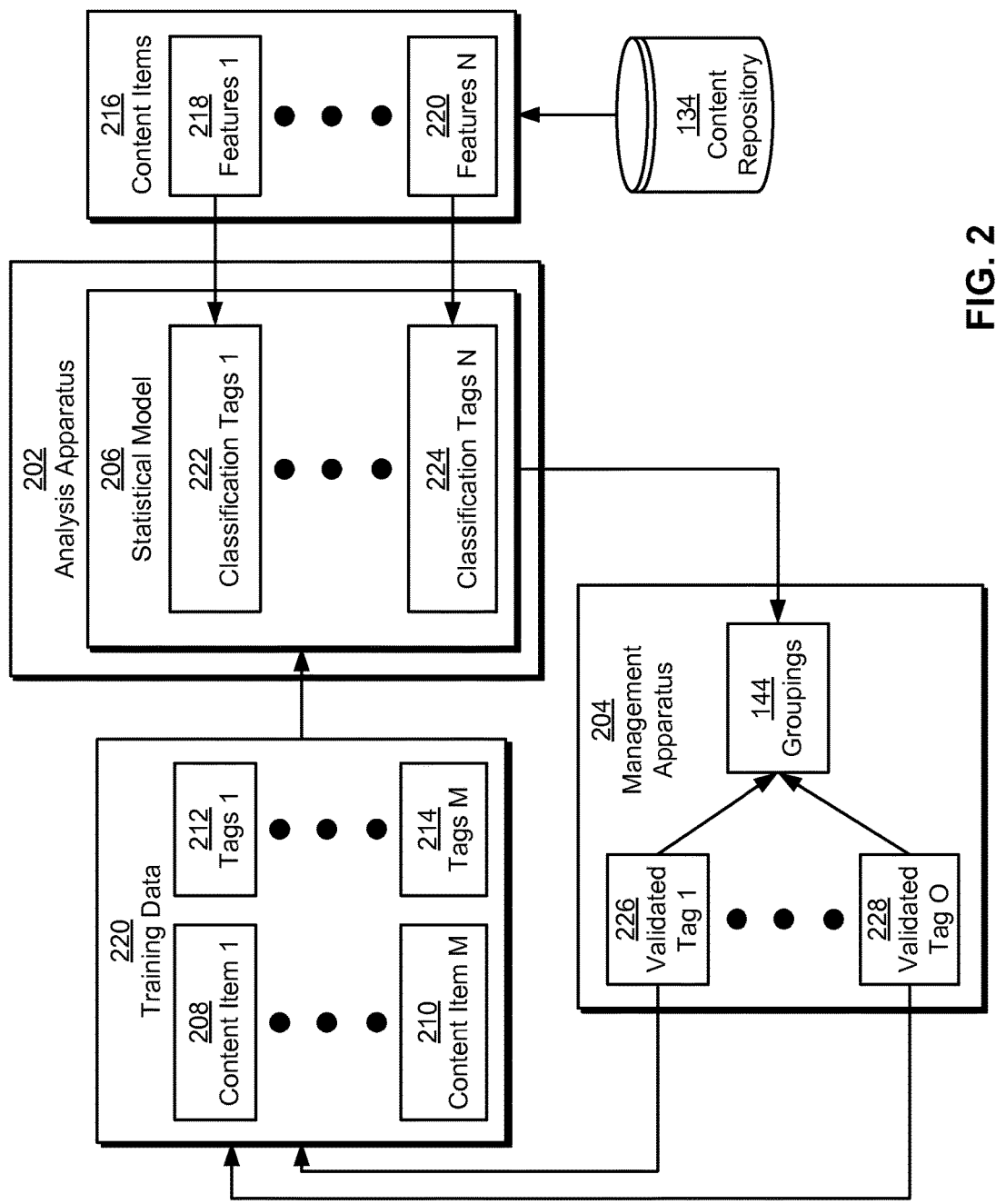
FIG. 2 shows a classification system in accordance with the disclosed embodiments.

FIG. 2 shows a classification system (e.g., classification system 132 of FIG. 1) in accordance with the disclosed embodiments. As mentioned above, the classification system may be used to classify content items 216 from content repository 134 with respect to a number of dimensions, such as dimensions 116 of FIG. 1. As shown in FIG. 2, the classification system includes an analysis apparatus 202 and a management apparatus 204. Each of these components is described in further detail below.

Analysis apparatus 202 may create a statistical model 206 for generating a set of classification tags (e.g., classification tags 1 222, classification tags n 224) for content items 216. For example, analysis apparatus 202 may create a support vector machine (SVM) that classifies content items 216 by a number of user-defined dimensions.

In one or more embodiments, classification tags generated by statistical model 206 include relevance tags that identify content items 216 as relevant or irrelevant to one or more topics. For example, analysis apparatus 202 may train statistical model 206 to determine the relevance of content items 216 to an online professional network (e.g., online professional network 118 of FIG. 1) and/or one or more products associated with the online professional network, such as sales, recruiting, marketing, and/or advertising products offered within the online professional network. Generation of relevance tags for content items is described in further detail below with respect to FIG. 3.

Analysis apparatus 202 may also configure statistical model 206 to generate other types of classification tags. Such classification tags may include a positive, negative, neutral, or unknown sentiment for each content item; one or more products related to the content item, such as products offered within the online professional network; value propositions associated with the products, such as hiring, marketing, sales, knowledge, networking, getting hired, connecting with other users, and/or internal or enterprise use of the online professional network; and/or themes or usage contexts associated with the content items, such as product feedback, self-promotion, and/or connecting with other users.

To create statistical model 206, analysis apparatus 202 may obtain training data 220 that includes a set of content items (e.g., content item 1 208, content item m 210). As mentioned above, the content items may include textual representations of user-generated content. The content items may be obtained from content repository 134 and/or another content source.

Training data 220 may also include one or more tags (e.g., tags 1 212, tags m 214) for each content item. The tag(s) may identify dimensions associated with the content item. For example, the tag(s) may identify relevance, sentiment, products, value propositions, themes, and/or other categories or topics related to the content item. The tag(s) may be stored as metadata for the content item and/or linked to the content item (e.g., using indexes or foreign keys).

In one or more embodiments, tags for content items in training data 220 are obtained from domain experts. For example, analysis apparatus 202, management apparatus 204, and/or another component of the classification system may provide a tagging tool that allows domain experts in the categories represented by the tags to manually add tags to the content items. The tagging tool may also allow the domain experts to include new categories and/or dimensions to the tags, thus enabling classification of other content items 216 by the categories and/or dimensions. For example, a domain expert may define a new dimension by which the content items are to be classified by adding a classification tag representing the dimension to one or more of the content items.

By obtaining tags in training data 220 from domain experts, the classification system may generate a relatively small but highly accurate set of training data 220 for statistical model. Alternatively, if a larger volume of training data 220 is needed, content items in training data 220 may be tagged using crowdsourcing techniques, in conjunction with or instead of tagging by the domain experts.

Next, analysis apparatus 202 may use training data 220 to produce statistical model 206. For example, analysis apparatus 202 may train an SVM to have one or more maximum-margin hyperplanes that divide content items in training data 220 into two or more classes represented by the corresponding tags.

After statistical model 206 is created from training data 220, analysis apparatus 202 may use statistical model 206 to generate a set of classification tags (e.g., classification tags 1 222, classification tags n 224) for additional content items 216 that are not in the original set of training data 220. For example, analysis apparatus 202 and/or another component of the classification system may obtain content items 216 from content repository 134 and generate a set of features (e.g., features 1 218, features n 220) from each of the content items. Analysis apparatus 202 may then provide the features for each content item as input to statistical model 206, and statistical model 206 may output one or more classification tags for the content item based on the inputted features.

In one or more embodiments, features from content items 216 that are inputted into statistical model 206 include one or more n-grams from content items 216. For example, the features may include unigrams, bigrams, and/or trigrams that represent topics in each content item, as generated by topic-mining system 102 of FIG. 1. If a content item includes one or more n-grams that are related to use of social media, such as n-grams that include the names of social media products or websites, the content item may include an additional feature that flags the content item as including a topic related to social media.

Second, the features may include one or more metrics associated with units of speech in content items 216. For example, the features may specify the number of characters, the number of capitalized characters, number of special characters, number of proper nouns, number of emoticons, number of words, and/or number of sentences in each content item. The features may also identify the average number of words in each sentence, percentage of special characters, percentage of emoticon characters, and/or number of Uniform Resource Locators (URLs) for each content item.

Third, the features may include profile data for the creators of content items 216. For example, features for a given content item may specify the name, age, title, company, school, location, interest, relationship, industry, groups, salary, experience level, reputation score, seniority, one or more skills, and/or other member segment of a user who created the content item. The profile data may be obtained from the online professional network, other social media, public records, and/or other sources of user data.

As with tags for content items in training data 220, classification tags generated by statistical model 206 may identify the dimensions associated with the content item, such as the content item's relevance to one or more topics, the sentiment of the content item, and/or one or more products, value propositions, or usage contexts related to the content item. For example, a social media post containing "I just landed a job through LinkedIn!" may have classification tags that include relevance to the online professional network, a positive sentiment, a recruiting product offered within the online professional network, a value proposition of getting hired, and a usage context of connecting with other users.

In turn, management apparatus 204 may output one or more groupings 144 of content items 216 by the classification tags. For example, management apparatus 204 may display groupings 144 within a GUI of a reporting system, such as reporting system 140 of FIG. 1. Within the GUI, users may sort, filter, and/or search for content items 216 based on the classification tags, topics, keywords, and/or other attributes of content items 216. The users may also view one or more charts and/or visualizations associated with the classification tags within the GUI. As a result, groupings 144 may allow the users to identify topics, themes, sentiments, opinions, and/or other characteristics of content items 216 related to dimensions represented by the classification tags.

Management apparatus 204 may additionally obtain one or more validated tags (e.g., validated tag 1 226, validated tag o 228) for content items 216 from the users. The validated tags may represent corrections to and/or verifications of classification tags for content items 216 from statistical model 206. Continuing with the above example, management apparatus 204 may use the GUI to display groupings 144 of content items 216 by the corresponding classification tags. Management apparatus 204 may also provide one or more user-interface elements for verifying and/or correcting the classification tags. In turn, the users may use the user-interface elements to change or confirm the relevance, sentiment, product classification, value proposition, and/or theme associated with each content item.

Management apparatus 204 may then provide the validated tags as additional training data 220 to statistical model 206, and analysis apparatus 202 may use the additional training data 220 to produce an update to statistical model 206. For example, analysis apparatus 202 may use validated tags for a subset of content items 216 to update an SVM for classifying the content items by dimensions represented by the validated tags. In turn, the validated tags may improve the accuracy with which the SVM produces subsequent classification tags for additional content items 216 from content repository 134. Consequently, the system of FIG. 2 may include functionality to classify text-based content items 216 using statistical model 206 and continuously improve the performance of statistical model 206 based on user validations of the classified content items.

Those skilled in the art will appreciate that the system of FIG. 2 may be implemented in a variety of ways. First, analysis apparatus 202, management apparatus 204, and/or data repository 134 may be provided by a single physical machine, multiple computer systems, one or more virtual machines, a grid, one or more databases, one or more filesystems, and/or a cloud computing system. Analysis apparatus 202 and management apparatus 204 may additionally be implemented together and/or separately by one or more hardware and/or software components and/or layers.

Second, the functionality of statistical model 206 may be implemented using different techniques. In particular, classification tags for content items 216 may be generated using an artificial neural network, naïve Bayes classifier, Bayesian network, clustering technique, logistic regression technique, decision tree, and/or other type of machine learning model or technique. Moreover, the same statistical model or separate statistical models may be used to generate various subsets of classification tags for content items 216. For example, a separate instance of statistical model 206 may be used to generate separate classification tags for relevance, sentiment, related products, value propositions, and/or themes in content items 216, or the same instance of statistical model 206 may be used to generate multiple classification tags for each content item. In another example, different versions of statistical model 216 may be trained on and used to classify different types of content items (e.g., user complaints, social media posts, forum posts, articles, etc.) by the same or different sets of dimensions.

Finally, training data 220 for producing statistical model 206 may be generated and/or validated in various ways. As mentioned above, validated tags may be obtained from users who view groupings 144 within a GUI provided by management apparatus 204 and used as additional training data 220 for statistical model 206. Validated tags may additionally or alternatively be obtained through other mechanisms and used to train and/or track the performance of statistical model 206 in other ways. For example, analysis apparatus 202, management apparatus 204, and/or other components of the classification system may obtain tags in training data 220 and/or verify classification tags from statistical model 206 using feedback from multiple users or domain experts. In turn, the feedback may be used to generate a "vote" on the quality of training data 220 and/or classification tags and allow the classification system to track the quality of training data 220 and/or the classification tags over time. The classification system may use the tracked quality to ensure that the accuracy of tags in subsequent training data 220 and/or classification tags from statistical model 206 increases over time. The classification system may also use the validated tags to verify that the accuracy of training data 220 is higher than a threshold (e.g., 80-90%) before statistical model 206 is created from training data 220 and/or subsequently used to perform classification of one or more additional sets of content items 216.

Figure 3:
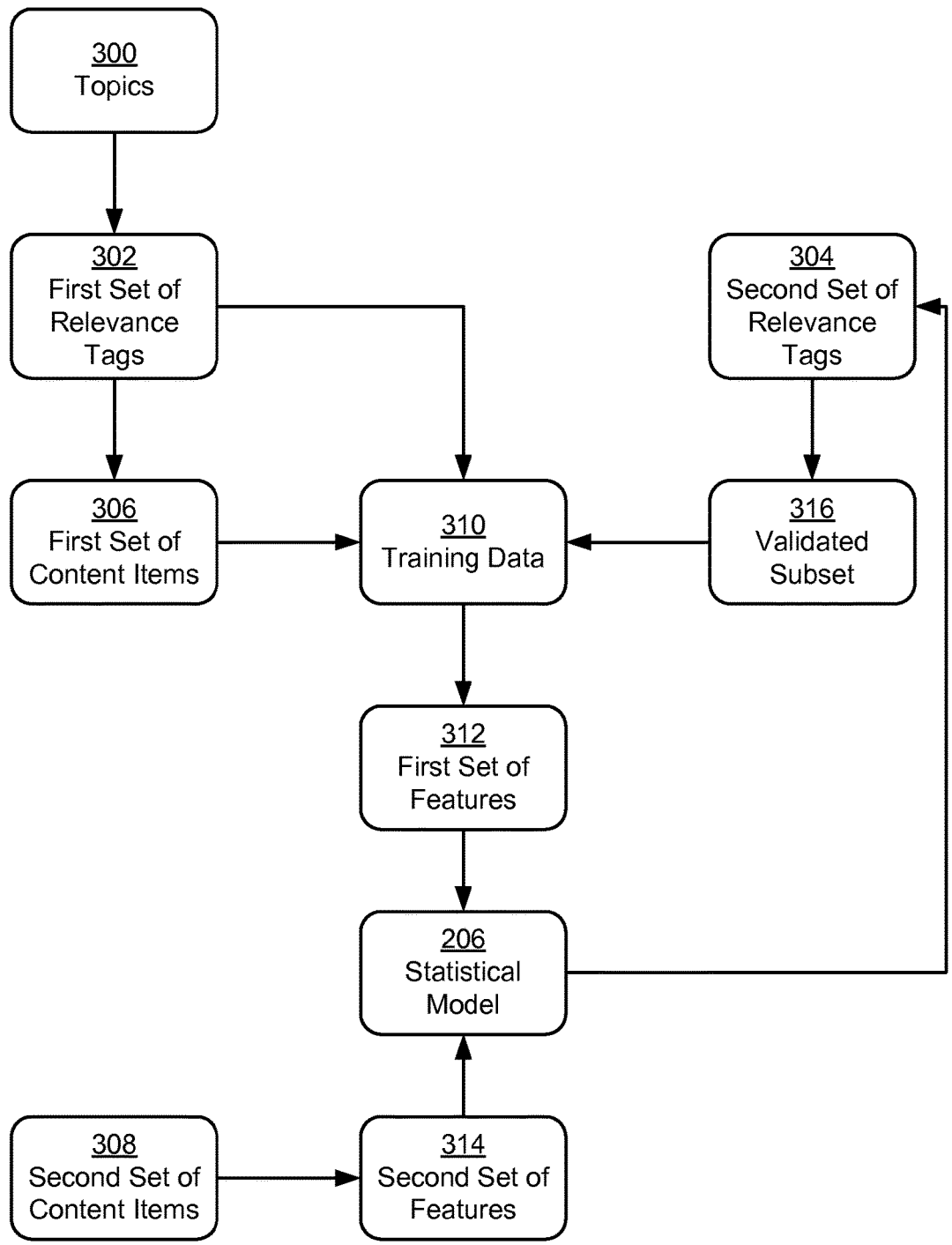
FIG. 3 shows the relevance-based classification of text in accordance with the disclosed embodiments.

FIG. 3 shows the relevance-based classification of text in accordance with the disclosed embodiments. As described above, such text classification may be performed by a classification system, such as classification system 132 of FIG. 1. More specifically, the classification system may produce statistical model 206 from training data 310 that includes a first set of content items 306 and a first set of relevance tags 302 for content items 306. The classification system may then use statistical model 206 to generate a second set of relevance tags 304 for a set of content items 308.

The first and second sets of relevance tags 302-304 may indicate the relevance of the corresponding content items to one or more topics 300. For example, the first and second sets of relevance tags 302-304 may identify the relevance of the first and second sets of content items 306-308 to an online professional network (e.g., online professional network 118 of FIG. 1), one or more products offered within the online professional network, and/or one or more teams or projects involved in implementing and updating the online professional network.

First, the classification system may obtain content items 306 and relevance tags 302 as training data 310 for statistical model 206. The first set of content items 306 may include articles, social media posts, forum posts, user feedback, and/or other textual representations of user-generated content. The first set of relevance tags 302 may be provided by one or more domain experts and identify the first set of content items 306 as relevant to one or more topics 300. For example, the domain expert(s) may be product managers, designers, and/or other users that manually tag the first set of content items 306 as relevant to topics 300 that include the online professional network, value propositions associated with the online professional network, teams that support the online professional network, and/or one or more products offered within the online professional network.

Next, the classification system may generate a first set of features 312 from training data 310. The first set of features 312 may include the first set of relevance tags 302 and/or other attributes of the first set of content items 306. For example, the first set of features 312 may include character counts such as a number of characters, a number of capitalized characters, and/or a number of special characters in each content item. The first set of features 312 may also include other metrics or statistics, such as a number of proper nouns, a number of emoticons, a number of words, a number of sentences, an average number of words in a sentence, a percentage of special characters, a percentage of emoticon characters, and/or a number of URLs in the content item. The first set of features 312 may further include one or more n-grams and/or topics in the content item, as well as a flag for the presence of a topic related to social media (e.g., mentioning a social media site) in the content item. Finally, the first set of features 312 may include profile data for a creator of the content item, such as the name, age, title, company, school, location, interest, relationship, industry, groups, salary, experience level, reputation score, seniority, one or more skills, and/or other member segment of the user who posted the content item. Consequently, the first set of features 312 may be significantly broader than keywords that are specific to topics 300.

The first set of features 312 may be used to train statistical model 206 to classify the first set of content items 306 according to the first set of relevance tags 302. For example, the first set of features 312 may be used to train an SVM to have one or more maximum-margin hyperplanes that divide the first set of content items 306 in training data 310 into two or more classes representing a relevance or lack of relevance to one or more topics, as indicated by relevance tags 302. Prior to training statistical model 206 using the first set of features 312, the classification system may verify that the accuracy of the first set of relevance tags 302 is higher than a threshold (e.g., 80-90%) by performing additional manual validation of the first set of relevance tags 302. For example, the classification system may select a random sample of the first set of relevance tags 302 and provide the sample to additional domain experts to verify that the accuracy of the sample exceeds the threshold.

After statistical model 206 is trained, the classification system may use statistical model 206 to generate a second set of relevance tags 304 for the second set of content items 308. As with the first set of content items 306 in training data 310, the classification system may generate a second set of features 314 from the second set of content items 308 and provide features 314 as input to statistical model 206. Output from statistical model 206 may then be used to generate the second set of relevance tags 304 for the second set of content items 308.

In other words, statistical model 206 may use the outputted second set of relevance tags 304 to classify the corresponding content items from the second set of content items 308 as relevant or not relevant to topics 300. For example, statistical model 206 may be an SVM that outputs a vector of binary values, with each position in the vector set to a value of 1 when relevance to the corresponding topic is found based on the second set of features 314 and a value of 0 when relevance to the topic is not found based on the second set of features 314. Values in the vector may then be stored as one or more relevance tags in the second set of relevance tags 304 and/or converted into another representation of the relevance tags, such as keywords or terms representing the topic(s) to which the corresponding content items are relevant.

The classification system may also obtain a validated subset 316 of the second set of relevance tags 304 and provide validated subset 316 as additional training data 310 to statistical model 206. Validated subset 316 may include manual changes to the second set of relevance tags 304. For example, the classification system may display the second set of content items 308 and the second set of relevance tags 304 within a GUI to a number of domain experts and/or other users that can judge and/or verify the relevance of the second set of content items 308 to topics 300. The users may use the GUI to confirm and/or change some or all of the second set of relevance tags 304, and the validated and/or changed tags may be added to validated subset 316 in training data 310.

Because validated subset 316 may be more accurate than the second set of relevance tags 304 and/or training data 310, additional training of statistical model 206 may increase the accuracy of statistical model 206 in classifying the relevance of additional sets of content items. In particular, validated subset 316 may be used to produce an update to statistical model 206, and the update may be used to generate additional relevance tags for additional sets of content items. Consequently, the accuracy of statistical model 206 may be increased by iteratively validating one or more subsets of relevance tags (e.g., second set of relevance tags 304) outputted by statistical model 206 and using the validated subsets as additional training data 310 for statistical model 206.

Figure 4:
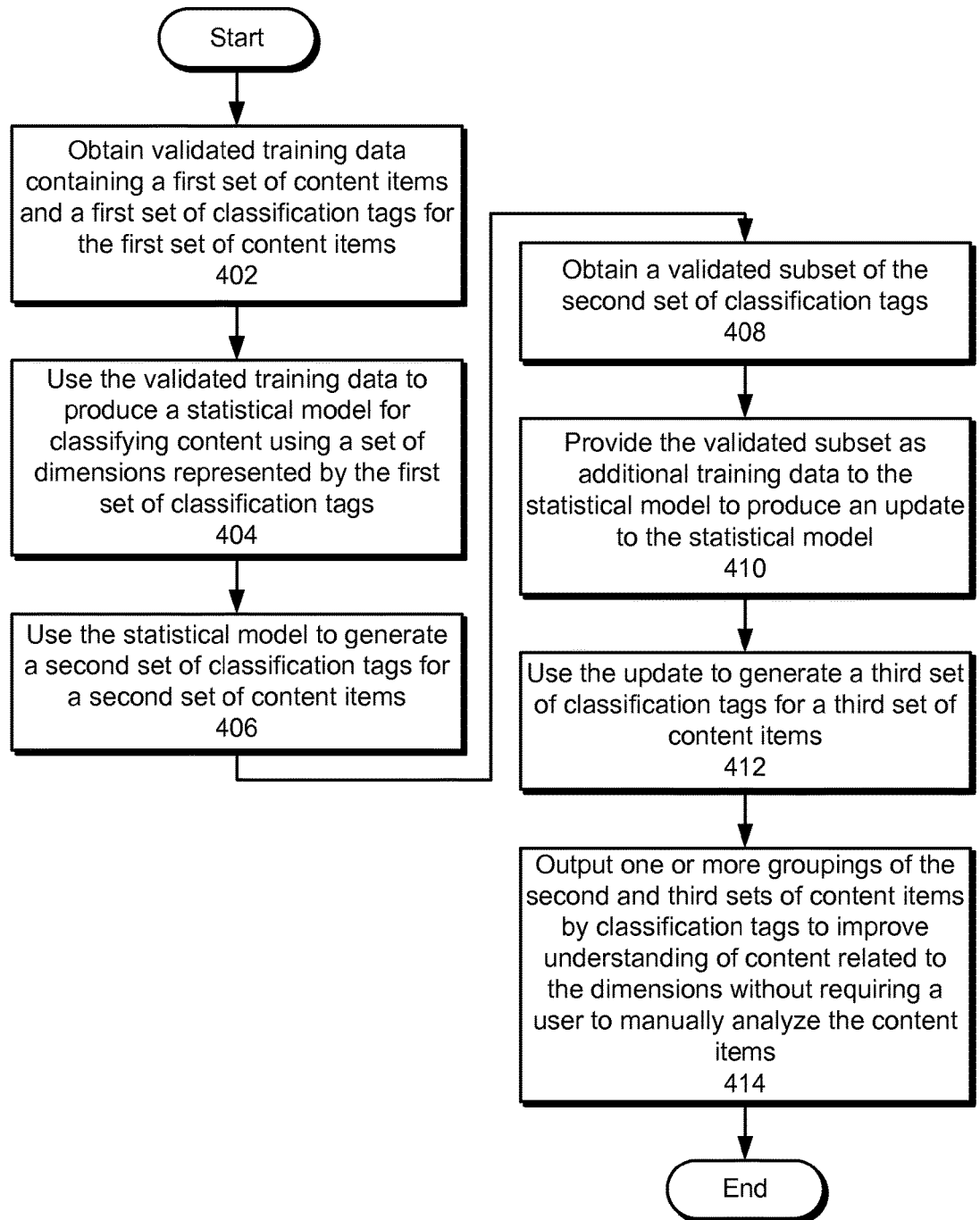
FIG. 4 shows a flowchart illustrating the process of classifying text in accordance with the disclosed embodiments.

FIG. 4 shows a flowchart illustrating the process of classifying text in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, validated training data containing a first set of content items and a first set of classification tags for the first set of content items is obtained (operation 402). The classification tags may be used to classify the content items with respect to a number of categories and/or dimensions. For example, the classification tags may identify a relevance, sentiment, product, value proposition, and/or usage context associated with each of the content items. The classification tags may be provided by one or more domain experts and/or other users with the ability to classify text-based content by the dimensions.

Next, the validated training data is used to produce a statistical model for classifying content using the set of dimensions represented by the first set of classification tags (operation 404). For example, the validated training data may be used to produce an SVM, naïve Bayes classifier, logistic regression model, and/or other type of model that classifies the first set of content items by the first set of classification tags. To produce the statistical model, a set of features may be generated from the content item and provided as input to the statistical model. The features may include a number of proper nouns, a number of emoticons, a number of words, a number of sentences, an average number of words in a sentence, a percentage of special characters, a percentage of emoticon characters, and/or a number of URLs in the content item. The features may also include one or more n-grams and/or topics in the content item, including a flag for the presence of a topic related to social media (e.g., mentioning a social media site) in the content item. Finally, the features may include profile data for a creator of the content item. As a result, the statistical model may be trained to identify patterns in the features that represent a certain class or dimension.

The statistical model is then used to generate a second set of classification tags for a second set of content items (operation 406). For example, the statistical model may be used to classify the relevance, sentiment, product, value proposition, theme, and/or other type of dimension associated with each content item in the second set of content items.

A validated subset of the second set of classification tags may also be obtained (operation 408). For example, the second set of content items and classification tags may be displayed to a set of users within a GUI and/or tagging tool, and some or all of the classification tags may be verified or corrected by the users through the GUI. The validated subset is provided as additional training data to the statistical model to produce an update to the statistical model (operation 410), and the update is used to generate a third set of classification tags for a third set of content items (operation 412). Because the statistical model is updated using additional validated training data, the accuracy of the statistical model may increase over time.

Finally, one or more groupings of the second and third sets of content items by the corresponding classification tags are outputted to improve understanding of content related to the dimensions without requiring a user to manually analyze the content items (operation 414). For example, groupings of the second and third sets of content items by the classification tags may be displayed within a GUI, along with user-interface elements for sorting, filtering, and/or searching the grouped content items by additional keywords, filters, attributes, and/or dimensions. Additional validations of the second and third sets of content items and classification tags may also be obtained through the GUI and used to further update the statistical model.

Figure 5:
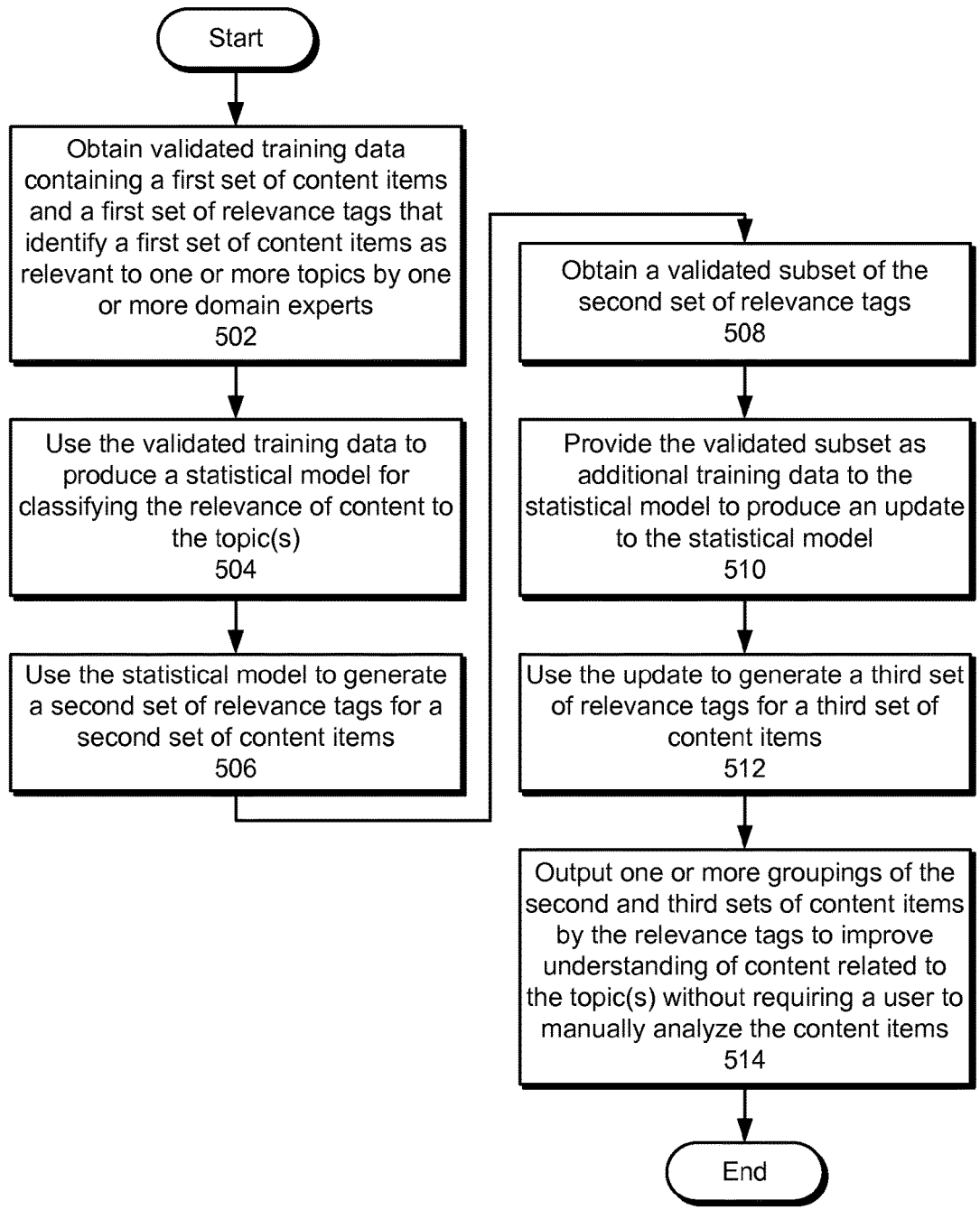
FIG. 5 shows a flowchart illustrating the process of performing relevance-based classification of text in accordance with the disclosed embodiments.

FIG. 5 shows a flowchart illustrating the process of performing relevance-based classification of text in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, validated training data containing a first set of content items and a first set of relevance tags that identify the first set of content items as relevant to one or more topics by one or more domain experts is obtained (operation 502). For example, the domain experts may add relevance tags to content items that are relevant to one or more products or features associated with an online professional network.

Next, the validated training data is used to produce a statistical model for classifying the relevance of content to the topic(s) (operation 504). For example, the validated training data may be used to create an SVM, naïve Bayes classifier, logistic regression model, and/or other type of model that classifies each content item in the first set of content items as relevant to or not relevant to a given topic based on the relevance tags for the content item. To produce the statistical model, a set of features may be generated from the content item and provided as input to the statistical model. The features may include a number of proper nouns, a number of emoticons, a number of words, a number of sentences, an average number of words in a sentence, a percentage of special characters, a percentage of emoticon characters, and/or a number of URLs in the content item. The features may also include one or more n-grams and/or topics in the content item, including a flag for a topic related to social media (e.g., mentioning a social media site) in the content item. Finally, the features may include profile data for a creator of the content item. As a result, the statistical model may be trained to identify patterns in the features that indicate relevance to a given topic.

The statistical model is then used to generate a second set of relevance tags for a second set of content items (operation 506). For example, the statistical model may be used to identify a subset of the second set of content items that includes content items relevant to a given topic represented by a type of relevance tag in the training data.

A validated subset of the second set of relevance tags is also obtained (operation 508). For example, the second set of content items and relevance tags may be displayed to a set of users within a GUI and/or tagging tool, and some or all of the relevance tags may be verified or corrected by the users through the GUI. The validated subset is provided as additional training data to the statistical model to produce an update to the statistical model (operation 510), and the update is used to generate a third set of relevance tags for a third set of content items (operation 512). Because the statistical model is updated using additional validated training data, the accuracy of the statistical model may increase over time.

Finally, one or more groupings of the second and third sets of content items by the corresponding relevance tags are outputted to improve understanding of content related to the topics without requiring a user to manually analyze the content items (operation 514). For example, groupings of the second and third sets of content items by the relevance tags may be displayed within a GUI, along with user-interface elements for sorting, filtering, and/or searching the grouped content items by additional keywords, filters, attributes, and/or topics. Additional validations of the second and third sets of content items and relevance tags may also be obtained through the GUI and used to further update the statistical model.

Figure 6:
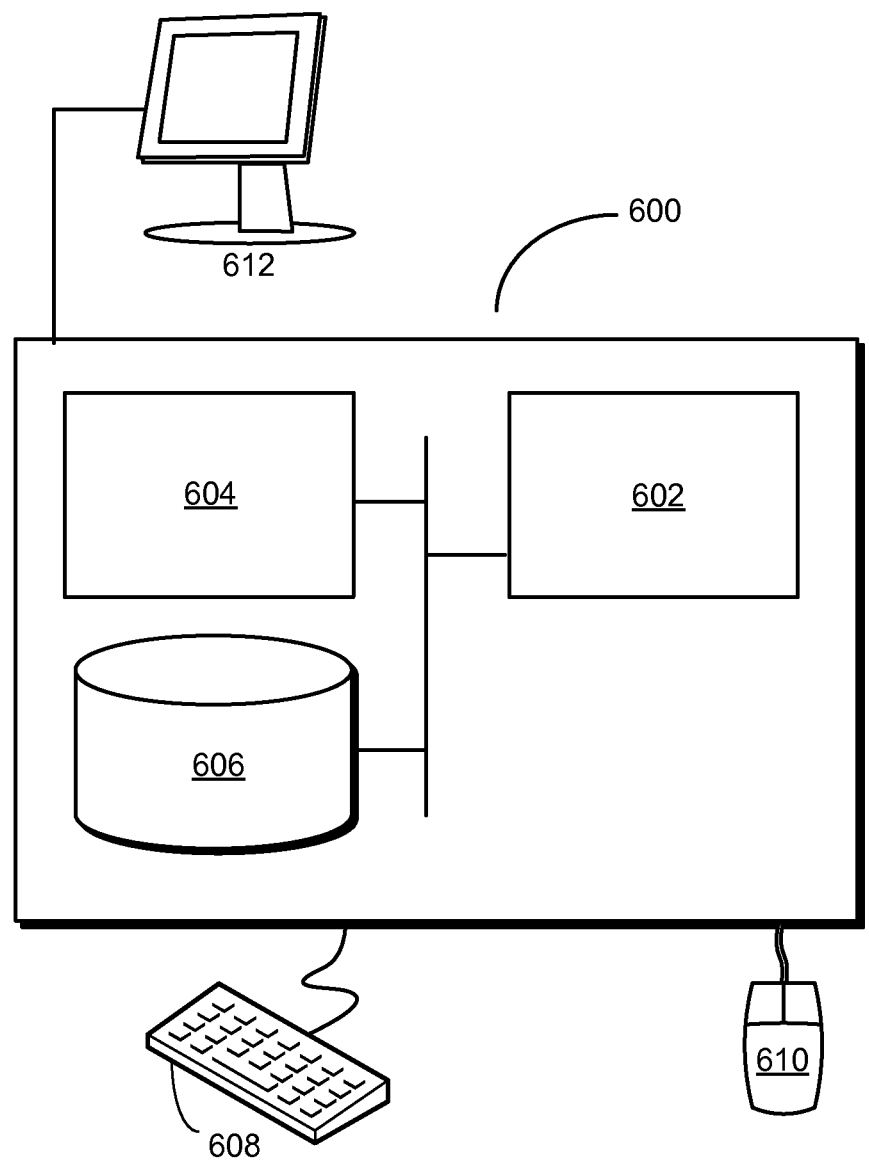
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system may include an analysis apparatus that obtains validated training data containing a first set of content items and a first set of classification tags for the first set of content items. In one or more embodiments, the classification tags include relevance tags that identify the relevance or lack of relevance of each content item in the first set of content items to one or more topics.

Next, the analysis apparatus may use the validated training data to produce a statistical model for classifying content using a set of dimensions represented by the first set of classification tags. The dimensions may include relevance, a sentiment, a product associated with an online professional network, a value proposition, a usage context, and/or another target class. The analysis apparatus may also use the statistical model to generate a second set of classification tags for a second set of content items.

The system may also include a management apparatus that outputs one or more groupings of the second set of content items by the second set of classification tags to improve understanding of content related to the set of dimensions without requiring a user to manually analyze the second set of content items. In one or more embodiments, the management apparatus outputs one or more groupings of the second set of content items by the second set of relevance tags to improve understanding of content related to the one or more topics without requiring a user to manually analyze the second set of content items.

In addition, one or more components of computer system 600 may be remotely located and connected to the other components over a network. Portions of the present embodiments (e.g., analysis apparatus, management apparatus, content repository, etc.) may also be located on different nodes of a distributed system that implements the embodiments. For example, the present embodiments may be implemented using a cloud computing system that obtains text-based content items from a set of remote users and classifies the content items according to a number of user-defined dimensions.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining validated training data comprising a first set of content items and a first set of classification tags for the first set of content items;
    using the validated training data to produce, by one or more computer systems, a statistical model for classifying content using a set of dimensions represented by the first set of classification tags;
    using the statistical model to generate, by the one or more computer systems, a second set of classification tags for a second set of content items which includes generating two or more classification tags from the first set of classification tags for at least one content item in the second set of content items; and
    outputting, by the one or more computer systems, one or more groupings of the second set of content items by the second set of classification tags to improve understanding of content related to the set of dimensions without requiring a user to manually analyze the second set of content items.

2. The method of claim 1, further comprising:
    obtaining a validated subset of the second set of classification tags for the second set of content items.

3. The method of claim 2, further comprising:
    providing the validated subset as additional training data to the statistical model to produce an update to the statistical model; and
    using the update to generate a third set of classification tags for a third set of content items.

4. The method of claim 2, wherein obtaining the validated subset of the second set of classification tags comprises:
    displaying the second set of content items and the second set of classification tags in a user interface; and
    obtaining one or more corrections to the second set of classification tags through the user interface.

5. The method of claim 1, wherein using the training data to produce the statistical model for classifying the relevance of content to the one or more topics comprises:
    generating a set of features from a content item in the first set of content items; and
    providing the set of features as input to the statistical model.

6. The method of claim 5, wherein the set of features comprises at least one of:
    one or more n-grams from the content items;
    a number of characters;
    a number of units of speech;
    an average number of units of speech; and
    a percentage of a character type.

7. The method of claim 5, wherein the set of features comprises profile data for a creator of the content item.

8. The method of claim 1, wherein the set of dimensions comprises a sentiment.

9. The method of claim 1, wherein the set of dimensions comprises a product associated with an online professional network.

10. The method of claim 1, wherein the set of dimensions comprises a value proposition.

11. An apparatus, comprising:
    one or more processors; and
    memory storing instructions that, when executed by the one or more processors, cause the apparatus to:
        obtain validated training data comprising a first set of content items and a first set of classification tags for the first set of content items;
        use the validated training data to produce a statistical model for classifying content using a set of dimensions represented by the first set of classification tags;
        use the statistical model to generate a second set of classification tags for a second set of content items, which includes generating two or more classification tags from the first set of classification tags for at least one content item in the second set of content items; and
        output one or more groupings of the second set of content items by the second set of classification tags to improve understanding of content related to the set of dimensions without requiring a user to manually analyze the second set of content items.

12. The apparatus of claim 11, wherein the memory further stores instructions that, when executed by the one or more processors, cause the apparatus to:
   obtain a validated subset of the second set of classification tags for the first set of content items;
   provide the validated subset as additional training data to the statistical model to produce an update to the statistical model; and
   use the update to generate a third set of classification tags for a third set of content items.

13. The apparatus of claim 12, wherein obtaining the validated subset of the first set of classification tags comprises:
   displaying the second set of content items and the second set of classification tags in a user interface; and
   obtaining one or more corrections to the second set of classification tags through the user interface.

14. The apparatus of claim 11, wherein using the training data to produce the statistical model for classifying the relevance of content to the one or more topics comprises:
   generating a set of features from a content item in the first set of content items; and
   providing the set of features as input to the statistical model.

15. The apparatus of claim 14, wherein the set of features comprises at least one of:
   one or more n-grams from the content items;
   a number of characters;
   a number of units of speech;
   an average number of units of speech;
   a percentage of a character type; and
   profile data for a creator of the content item.

16. The apparatus of claim 11, wherein the set of dimensions comprises a sentiment.

17. The apparatus of claim 11, wherein the set of dimensions comprises a product associated with an online professional network.

18. The apparatus of claim 11, wherein the set of dimensions comprises a value proposition.

19. A system, comprising:
   an analysis non-transitory computer-readable medium comprising instructions that, when executed by one or more processors, cause the system to:
      obtain validated training data comprising a first set of content items and a first set of classification tags for the first set of content items;
      use the validated training data to produce a statistical model for classifying content using a set of dimensions represented by the first set of classification tags; and
      use the statistical model to generate a second set of classification tags for a second set of content items, which includes generating two or more classification tags from the first set of classification tags for at least one content item in the second set of content items; and
   a management non-transitory computer-readable medium comprising instructions that, when executed by one or more processors, cause the system to output one or more groupings of the second set of content items by the second set of classification tags to improve understanding of content related to the set of dimensions without requiring a user to manually analyze the second set of content items.

20. The system of claim 19, wherein the analysis non-transitory computer-readable medium further instructions that, when executed by the one or more processors, cause the system to:
   obtain a validated subset of the second set of classification tags for the first set of content items;
   provide the validated subset as additional training data to the statistical model to produce an update to the statistical model; and
use the update to generate a third set of classification tags for a third set of content items.

* * * * *